United States Patent [19]

Quesnell, Jr.

[11] 4,100,541
[45] Jul. 11, 1978

[54] HIGH SPEED MANCHESTER ENCODER

[75] Inventor: Harris A. Quesnell, Jr., San Diego, Calif.

[73] Assignee: The United States of America as represented by the Secretary of the Navy, Washington, D.C.

[21] Appl. No.: 708,779

[22] Filed: Jul. 26, 1976

[51] Int. Cl.² ............................................. H03K 13/24
[52] U.S. Cl. ............................................. 340/347 DD
[58] Field of Search ............... 340/347 DD; 360/42; 178/67, 66 R

[56] References Cited

U.S. PATENT DOCUMENTS

| 2,853,357 | 9/1958 | Barber | 360/42 |
| 3,001,140 | 9/1961 | Beck | 178/66 R |
| 3,008,124 | 11/1961 | Warnock | 178/66 R |
| 3,047,853 | 7/1962 | Machol | 340/347 DD |
| 3,141,929 | 7/1964 | George | 178/66 R |
| 3,202,975 | 3/1962 | Magotteaux | 360/42 |
| 3,348,149 | 10/1967 | Crafts | 178/67 |

Primary Examiner—Charles D. Miller
Attorney, Agent, or Firm—R. S. Sciascia; G. J. Rubens; T. M. Phillips

[57] ABSTRACT

High speed manchester encoding is provided by latching input data by means of a first clock pulse to provide a synchronized data source. This synchronized data is latched and inverted in a second latch circuit by a second clock pulse 180° out of phase with the first clock pulse. The synchronized and inverted data is fed to a multiplexer where either data or $\overline{data}$ is selected depending on the state of the master clock applied to the select input of the multiplexer. The output from the multiplexer is the manchester encoded data stream.

8 Claims, 3 Drawing Figures

HIGH SPEED MANCHESTER ENCODER

BACKGROUND OF THE INVENTION

The present invention relates to manchester encoders and more particularly to a high speed manchester encoder which employs a multiplexing technique to generate the manchester code. Prior known means of generating the manchester code is by the exclusive-or logic function. The clock and data bit are applied to the inputs of an exclusive OR gate. When both inputs are 0 the output is 0. When the clock input is 0 and the data bit is 1 the output is a 1. When the clock input is 1 and the data input is 0 the output is 1. When both clock and data bit inputs are 1s the output is a 0. Space or "0" is an up transition during the bit period. Mark "1" is a down transition during the bit period. This type of manchester encoder suffers from the disadvantages of the necessity of having the trailing and leading edges of the clock and data bit in coincidence and the clock must be synchronized with the data bit.

SUMMARY OF THE INVENTION

The present invention provides for an improved high speed manchester encoder which overcomes the above mentioned disadvantages. In the present invention the input data bit is encoded by multiplexing action and overcomes the disadvantages of the exclusive-or logic function. The unique multiplexing technique is accomplished by providing two data streams from a single data source to a multiplexing circuit. The first data stream is synchronized with a first clock source while the second data stream is inverted and synchronized with a second inverted clock. The selection of the data to be multiplexed is determined by the state of the clock source which is applied to the select input of the multiplexer.

Accordingly, an object of the present invention is the provision of a high speed manchester encoder.

Another object of the invention is the provision of a high speed manchester encoder which inherently synchronizes the data bit with the clock.

Another object is the provision of a high speed manchester encoder wherein less than a 50% duty cycle in the clock signal will not cause a glitch in the output wave shape.

Another object of the present invention is the provision of a high speed manchester encoder wherein the frequency of the encoder is limited only by the propagation delays through the circuits.

Another object of the invention is the provision of a high speed manchester encoder circuit wherein the difference in rise times and fall times of the clock pulses and data bit is not as critical as the case with the exclusive-or logic gate circuit.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
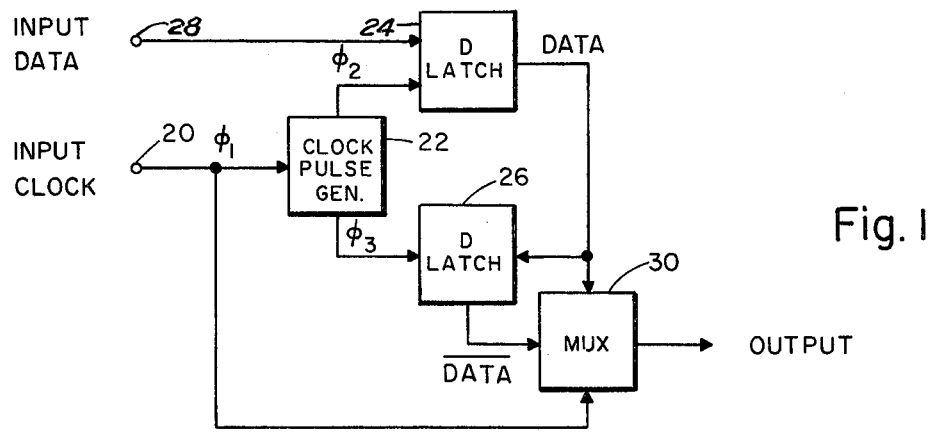
FIG. 1 is an overall block diagram of the invention.

Referring now to the drawings wherein there is shown in FIG. 1 an input terminal 20 to which a master clock, $\phi_1$, is fed to a clock pulse generator 22. Clock pulse generator 22 provides two output clocks $\phi 2$ and $\phi 3$. These two clocks are 180° out of phase with respect to each other. Clock pulse $\phi 2$ is fed to a D latch circuit 24. Clock $\phi 3$ is fed to a D latch circuit 26. An input data word applied at input terminal 28 is the second input to D latch 24 which outputs a data stream that is fed as one input to multiplexer 30. The output data from D latch circuit 24 is latched and inverted in the D latch circuit 26 which output is fed as a second input to multiplexer 30. The input clock source applied to terminal 20 is also applied to multiplexer circuit 30 which selects one or the other of the outputs from D latch circuits 24 or 26 to provide the manchester encoded data stream.

Figure 2:
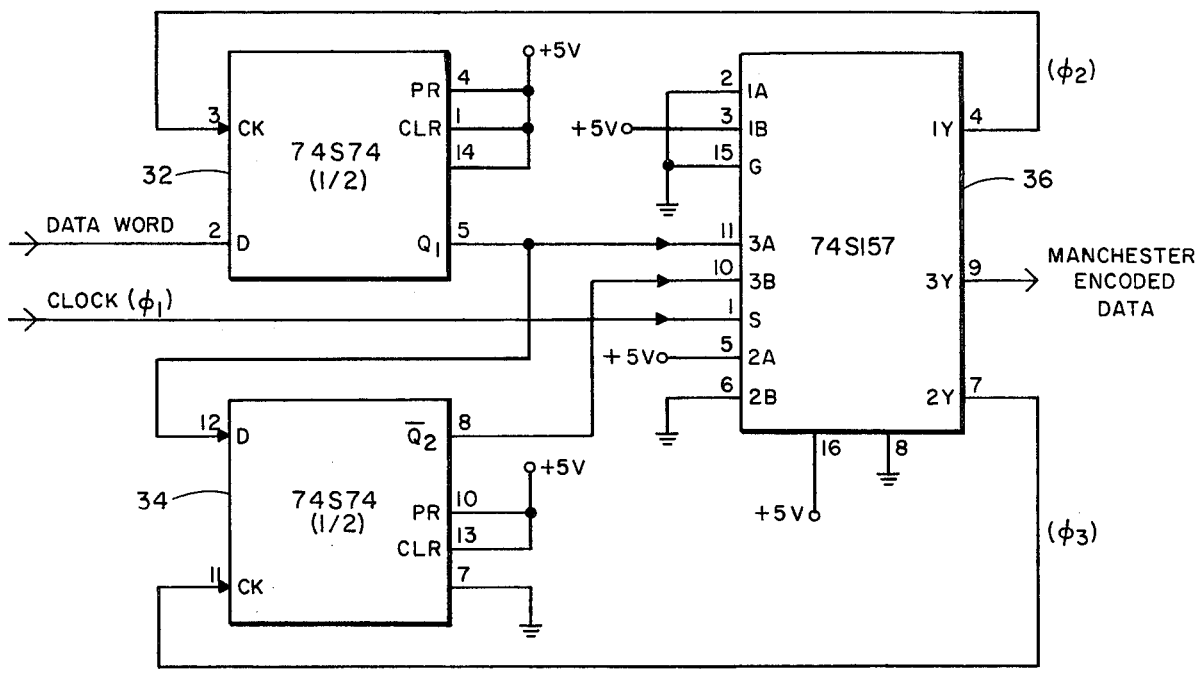
FIG. 2 is a schematic diagram of the invention.
Figure 3:
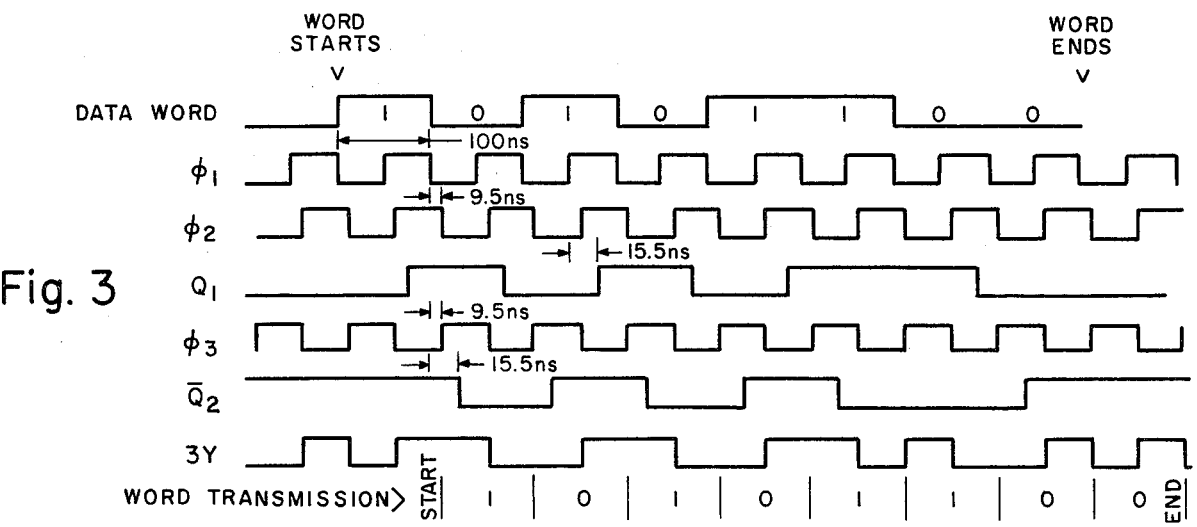
FIG. 3 are waveforms used in describing the operation of the encoder.

Referring now to the schematic diagram of FIG. 2 and the waveforms of FIG. 3, the "in" and "out" of phase clocks $\phi 2$ and $\phi 3$ are generated respectively by applying the clock signal $\phi_1$ to the S terminal of a 74S157 integrated circuit. The output signals from terminals 1Y and 2Y are the "in" and "out" of phase clock pulses $\phi 2$ and $\phi 3$, respectively. One-half of a 74S74 integrated circuit 32 performs the function of the D latch circuit 24 and is clocked by the positive transition of the in phase clock $\phi_2$. The output $\phi 1$ is the synced data bit. Latch circuit 34 is the other half of the 74S74 integrated circuit. After the data bit is latched in integrated circuit 32, the positive transition of the "out" of phase clock $\phi_3$ latches the data bit in integrated circuit 34. The output $\overline{Q}_2$ is the inverted data bit.

Integrated circuit 74S157 is a two to one multiplexer with $\phi_1$ the line selector. The leading edge of $\phi_1$ selects line 3B, $(\overline{Q}_2)$ where the trailing edge selects 3A $(Q_1)$. The resultant output manchester encoded data stream appears at the output terminal 3Y.

In FIG. 3 the data word represents all possible combinations of a binary bit stream. $\phi_1$ is the master clock waveform while $\phi_2$ is the "in" phase clock and $\phi_3$ is the out of phase clock. It should be noted that the 9.5 ns is the typical propagation delay through the 74S157 multiplexer. $Q_1$ shows the corresponding output waveform of the latch circuit 32. $Q_2$ shows the inverted output waveform of the latch circuit 34. The 15.5 ns is the total propagation delay referenced to the master clock, $\phi_1$.

As can be seen when the master clock $\phi_1$ is a logic zero, the $Q_1$ output is selected and appears at the output terminal 3Y. When the master clock goes to a logic one, the inverted output $\overline{Q}_2$ is selected and appears at the output terminal 3Y. The corresponding data word is shown below the manchester encoded data stream, 3Y.

Obviously many modifications and variations of the present invention are possible in the light of the above teachings. It is therefore to be understood that within the scope of the appended claims the invention may be practiced otherwise than as specifically described.

What is claimed is:
1. A high speed manchester encode comprising:
   (a) input means for receiving serial data,
   (b) synchronizing means coupled to said input means for providing a first data stream and a second delayed and inverted data stream,
   (c) a multiplexer coupled to said synchronizing means for selecting either of said data streams to provide a manchester encoded data stream output.

2. The encoder of claim 1 wherein said synchronizing means includes a first latch circuit coupled to said input means and being latched by a first clock source and a second latch circuit coupled to said first latch circuit and being latched by a second clock source 180° out of phase with the first clock source.

3. The encoder of claim 2 wherein said first and second clock sources are generated from a master clock source.

4. The encoder of claim 3 wherein said multiplexer is of the time dimension type and responds to a logic zero to select said first data stream and responds to a logic one to select said second data stream.

5. A high speed manchester encoder comprising:
 (a) a source of serial data,
 (b) latch circuit means for converting said serial data to a first data stream synchronized with a first clock source and a second data stream that is inverted and synchronized with a second inverted clock source,
 (c) a multiplexer coupled to said latch circuit means for selecting either of said data streams determined by the state of the clock source applied to the select input.

6. The encoder of claim 5 wherein said latch circuit means includes:

(a) a first D latch circuit having a first input coupled to said data source, a second input coupled to the first clock source and having an output,
 (b) a second D latch circuit having a first input coupled to the output of said first D latch circuit, a second input coupled to the inverted clock source and having an output.

7. The encoder of claim 6 wherein the select clock source of said multiplexer is of the same frequency as said first and second clock sources.

8. A high speed manchester encoder comprising:
 (a) a source of input serial data,
 (b) a master clock source,
 (c) a clock pulse generator coupled to said master clock source for generating two clocks 180° out of phase with each other,
 (d) a first D latch circuit having a first input coupled to said data source, a second input coupled to one of said clocks and having an output,
 (e) a second D latch circuit having a first input coupled to the output of said first D latch circuit, a second input coupled to the other of said clocks and having an inverted output,
 (f) a multiplexer having a first input coupled to the output of said first D circuit, a second input coupled to the inverted output of said second D latch circuit, a select input coupled to said master clock source and having an output.

* * * * *